US007053595B1

(12) United States Patent
Mei et al.

(10) Patent No.: US 7,053,595 B1
(45) Date of Patent: May 30, 2006

(54) COMPENSATION CIRCUIT FOR OUTPUT VOLTAGE CORRECTION DUE TO PROPAGATION DELAYS IN HYSTERETIC CONTROL LOOPS

(75) Inventors: Tawen Mei, Mountain View, CA (US); Chunping Song, Santa Clara, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 61 days.

(21) Appl. No.: 10/883,927

(22) Filed: Jul. 2, 2004

(51) Int. Cl.
*G05F 1/40* (2006.01)

(52) U.S. Cl. ..................... 323/283; 323/285; 361/93.1

(58) Field of Classification Search ........ 323/282–287, 323/290, 320, 250, 351; 363/80, 97, 98, 363/72, 76; 361/90, 93.1
See application file for complete search history.

(56) References Cited

U.S. PATENT DOCUMENTS 6,495,995 B1 * 12/2002 Groom et al. .............. 323/283

OTHER PUBLICATIONS

Gu, Wei and Issa Batarseh. 2001. "Interleaved Synchronous Buck Regulator with hysteretic voltage control." *Power Electronics Specialist Conference, IEEE* 32nd *Annual.* 3:1512-16, no date.
Jurasek, G., et al. 1996. "Hysteretic Current Mode Controller." *Applied Power Electronics Conference and Exposition, IEEE.* 2:861-68, no date.
Locascio, James J. and William Cho. 1993. "New IC's and Control Techniques for Battery Powered Systems." *Wisconsin/'93 Conference Record.* pp. 388-395, no date.

* cited by examiner

*Primary Examiner*—Rajnikant B. Patel
(74) *Attorney, Agent, or Firm*—John W. Branch; Darby & Darby PC (57) ABSTRACT

A method and circuit for compensating offset errors caused by propagation delays in hysteretic control loops. An overshoot voltage $V_{OS}$, caused mainly by an inductor current overshoot, is tracked and held when a switch is to be turned off, and again when the switch actually turns off. A timing logic circuit provides control signals to a sample and hold circuit based on switch signals SW and OUT. A difference between the two sampled voltages is applied to a reference voltage in a hysteretic voltage regulator. By monitoring the overshoot voltage and automatically compensating for it in real-time, a knowledge of a value of the propagation delay is not needed. Thus, significantly improved accuracy may be achieved despite variable factors such as propagation delay variations, temperature changes, component tolerances, and the like.

18 Claims, 5 Drawing Sheets

COMPENSATION CIRCUIT FOR OUTPUT VOLTAGE CORRECTION DUE TO PROPAGATION DELAYS IN HYSTERETIC CONTROL LOOPS

FIELD OF THE INVENTION

The present invention relates to power supplies and more specifically an output voltage correction method and circuit for compensating offset errors caused by propagation delays in hysteretic control loops.

BACKGROUND

To satisfy power supply and dynamic requirements of today's microprocessors and related communication systems, many approaches have been implemented. Single-phase voltage-mode hysteretic control, also called "bang—bang" control or ripple regulator control, typically maintains an output voltage within a hysteresis band centered about an internal reference voltage. If the output voltage reaches or exceeds the reference voltage plus one-half of the hysteresis band, the controller turns OFF the high-side switch, which can be a Metal-Oxide Semiconductor Field-Effect Transistor (MOSFET), and turns ON the low-side switch, to block energy from being transferred from an input to an output. This latter condition is a power stage OFF-state, and causes the output voltage to decrease.

When the output voltage is at or below the level of the reference minus one-half of the hysteresis band, the power stage goes into ON-stage, and the controller turns ON the high-side switch, and turns OFF the low-side switch to allow energy transfer from the input to the output, which causes the output voltage to increase. This hysteretic method of control keeps the output voltage within the hysteresis band around the reference voltage. Thus, an output voltage of one volt is generally corrected from a deviation as small as a few millivolts as quickly as an output filter allows.

In an ideal hysteretic control circuit, an output voltage is typically regulated into a hysteresis band and a DC value of the output voltage is equal to a reference voltage, hence there is no DC error. A significant benefit of hysteretic control is its fast response. If an output-load current step or an input-voltage transient forces the output voltage out of the hysteresis band, the control circuit may set a power-stage MOSFET in a continuous on or off state as required to return the output voltage back to the hysteresis band. Thus, the output voltage may be corrected as quickly as an output filter allows. Generally, there are no delays from an error amplifier and its associated feedback loop as there are in voltage- and current-mode controllers. Other advantages of hysteretic control include no feedback-loop compensation and no input filter interaction problems. Thus, hysteretic control is a relatively inexpensive and simple regulation architecture.

Commonly used hysteretic control circuits have poor regulation accuracy, however. Typically inaccuracies up to 30 mV are not uncommon. For applications such as microprocessors, where accuracies exceeding 20 mV may not be acceptable, poor regulation accuracy of a hysteretic control circuit may make it undesirable although its fast response and robustness may make it attractive. To overcome the propagation delay's influence and to improve hysteretic control circuit's accuracy, typically circuits may be over-designed, resulting in increased cost and sacrificed performance.

Thus, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment or an embodiment combining software and hardware aspects. The following detailed description is, therefore, not to be taken in a limiting sense.

Briefly stated, the present invention is related to an output voltage correction method and circuit for correcting offset errors caused by propagation delays in hysteretic control loops.

An overshoot component $V_{OS}$ of an output voltage $V_{OUT}$, caused mainly by an inductor current overshoot, may be tracked and held when a switch is to be turned off, and again when the switch actually turns off. A timing logic circuit may provide control signals to a sample and hold circuit based on switch signals OUT and SW reflecting a time of decision to turn off the switch and a time of actual turn-off of the switch, respectively. A difference between the two sampled voltages is applied to a reference voltage in a hysteretic voltage regulator. By monitoring the overshoot voltage and automatically compensating for it in real-time, knowing a value of the propagation delay is not needed. Thus, significantly improved accuracy may be achieved despite variable factors such as propagation delay variations, temperature changes, component tolerances, and the like.

While a preferred embodiment of the present invention may be implemented in a hysteretic voltage regulator circuit, the invention is not so limited. The described circuit may be employed as part of virtually any hysteretic control circuit known to those skilled in the art.

Figure 1:
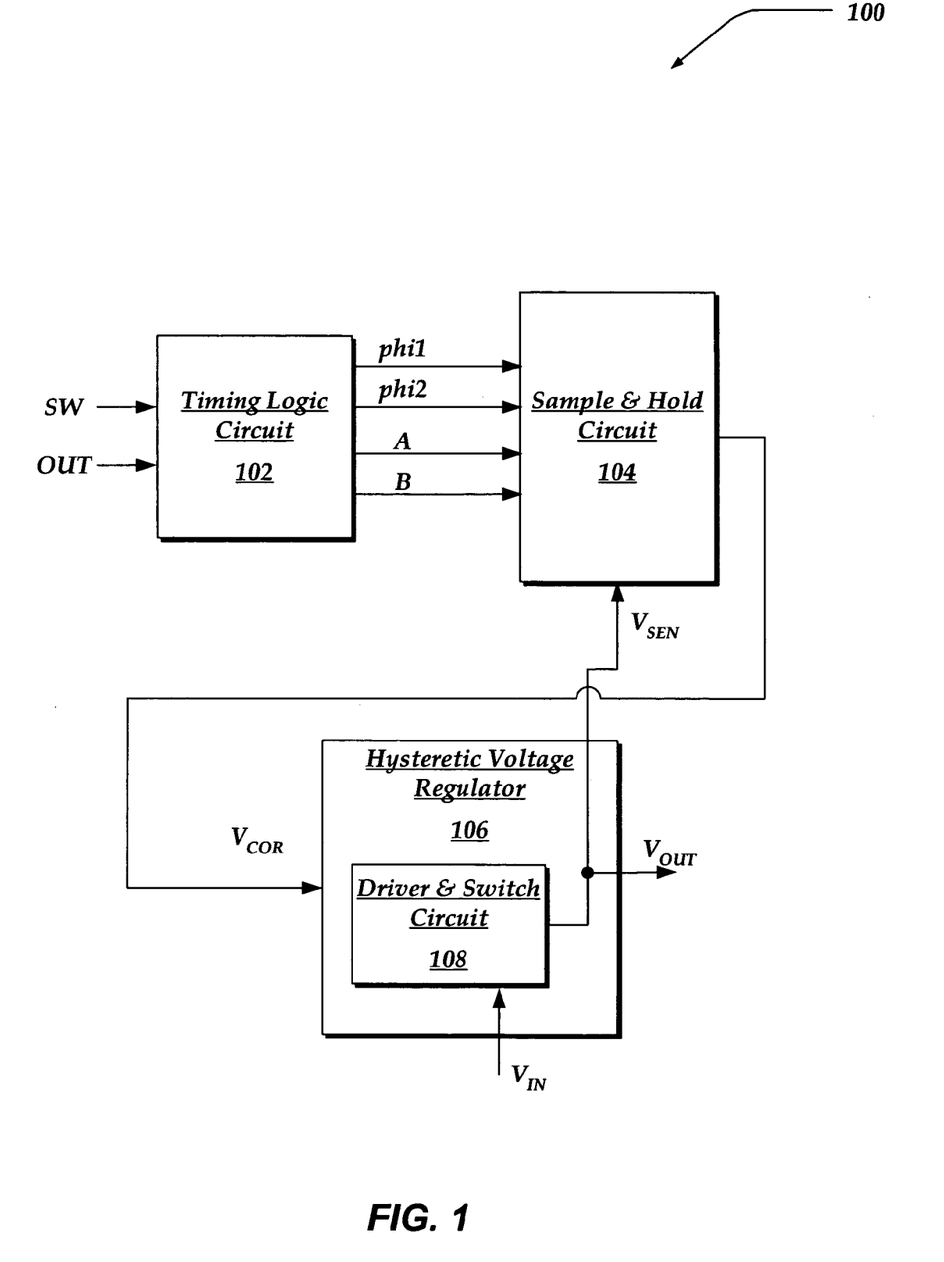
FIG. 1 illustrates a block diagram of an embodiment of a hysteretic control circuit according to the present invention.

FIG. 1 illustrates block diagram of an embodiment of a hysteretic control circuit 100. Hysteretic control circuit 100 includes timing logic circuit 102, sample and hold circuit 104, hysteretic voltage regulator 106, driver and switch circuit 108.

An output voltage inaccuracy of a hysteretic control circuit may be caused mainly by an inductor current overshoot, which causes the output voltage to overshoot by overshoot voltage $V_{OS}$. A DC offset component of the output voltage $V_{OUT}$ due to this delay may be about one half of $V_{OS}$. According to one aspect of the present invention $V_{OS}$ is sampled by tracking and holding the output voltage at two instances: first when the switch is to be turned off, and second when the switch actually turns off. A difference between the two sampled voltages may be equal to $V_{OS}$, and may be applied to a reference voltage.

Timing logic circuit 102 is arranged to receive logic input signals SW and OUT. Logic signals OUT and SW are trigger signals representing when a switch is to be turned off and when the switch is actually turned off with a propagation delay of $t_d$. Timing logic circuit 102 is further arranged to provide control signals A, B, phi1, and phi2 to sample and hold circuit 104.

Control signals A, B, phi1, and phi2 are determined based on OUT and SW, and are employed to enable $V_{SEN}$ to be sampled when the switch is to be turned off and when the switch actually turns off. In one embodiment, control signals A, B, phi1, and phi2 may be employed as gate voltages of sampling transistors in a sample and hold circuit such that the sampling transistors are turned on based on high values of either control signal.

Sample and hold circuit 104 is arranged to receive sensed overshoot voltage $V_{SEN}$ from hysteretic voltage regulator 106 and provide correction voltage $V_{COR}$ to the hysteretic voltage regulator in response to $V_{SEN}$ and control signals A, B, phi1, and phi2 from timing logic circuit 102. Sample and hold circuit 104 samples $V_{SEN}$ based on the control signals when the switch is to be turned off, and when the switch actually turns off. The sampled voltages are then combined in a differential amplifier providing correction voltage $V_{COR}$.

Hysteretic voltage regulator 106 is arranged to receive input signal $V_{IN}$ and provide regulated output voltage $V_{OUT}$ in response to the input signal and correction voltage $V_{COR}$. $V_{COR}$ provides correction for a DC offset of output voltage $V_{OUT}$ due to an overshoot component of the output voltage generated by an inductor of an output filter. $V_{SEN}$ is a voltage after the inductor that may be sensed and provided to sample and hold circuit 104 as well as to a driver and switch circuit 108 as feedback.

FIG. 1 shows a particular arrangement of inputs and outputs of the various components. In one embodiment, all of the components of hysteretic control circuit 100 may be included in the same chip. Alternatively, one or more of the components may be off-chip.

Figure 2:
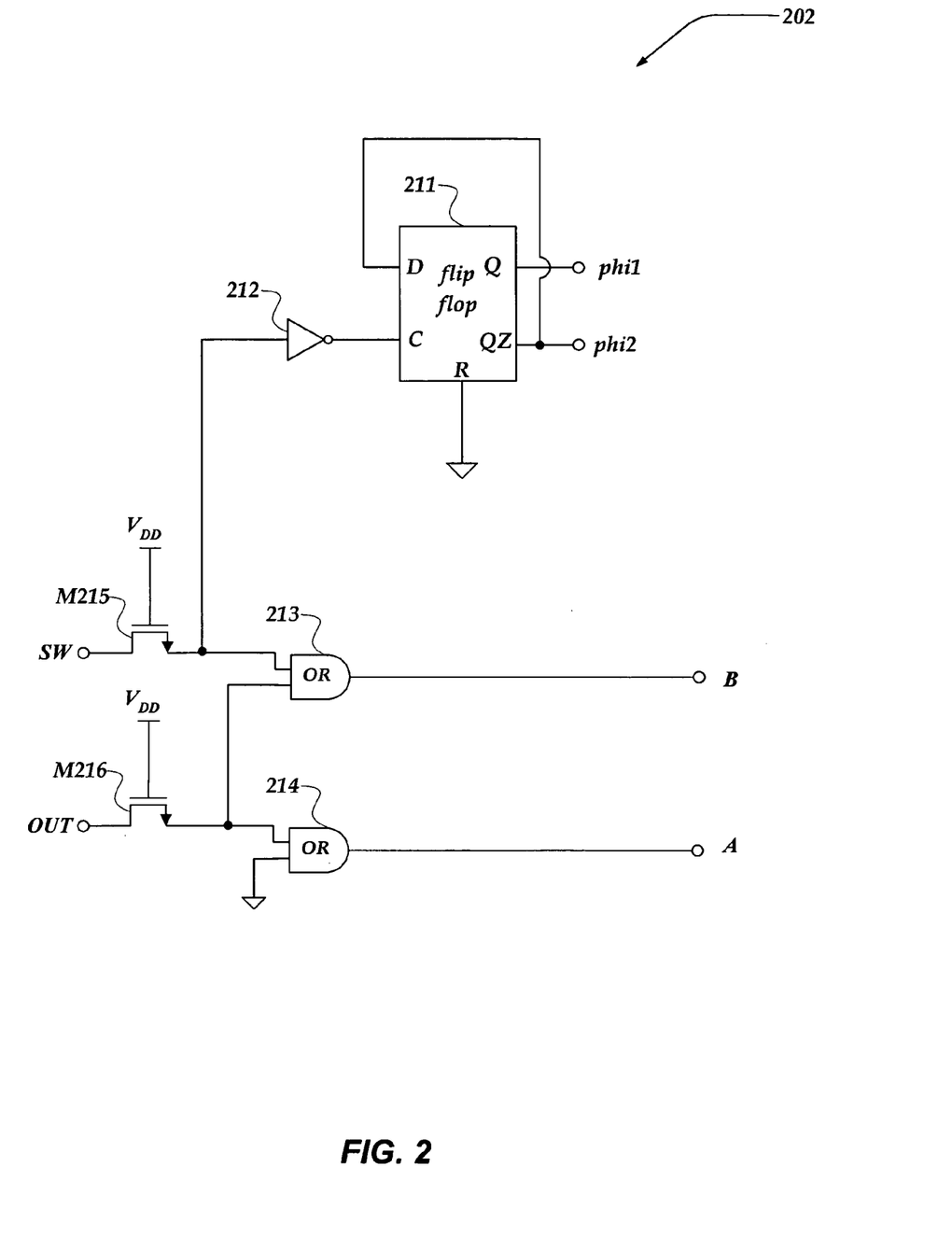
FIG. 2 schematically illustrates an embodiment of a timing logic circuit of FIG. 1.

FIG. 2 schematically illustrates an embodiment of timing logic circuit 202 that may be implemented in hysteretic control circuit 100 of FIG. 1. Timing logic circuit 102 is arranged to receive logic input signals SW and OUT, and provide control signals A, B, phi1, and phi2 to a sample and hold circuit.

Timing logic circuit 202 includes transistors M215 and M216, logic OR operators 213 and 214, inverter 212, and flip flop 211. Transistor M215 is arranged to protect logic OR operator 213 from a high voltage that may be present on the line carrying input signal SW. Transistor M216 is arranged to match a propagation delay introduced by transistor M215 such that both lines operate with substantially similar timing. Transistor M215 is configured to receive SW at its source and provide SW to an input of logic OR operator 213 and to inverter 212. Transistor M216 is arranged to receive OUT at its source and provide OUT to an input of logic OR operator 213 and an input of logic OR operator 214. Another input of logic OR operator 214 is coupled to a ground. Logic OR operator 214 is arranged to provide control signal A. Logic OR operator 213 is arranged to provide control signal B based on an OR operation between SW and OUT.

Figure 3:
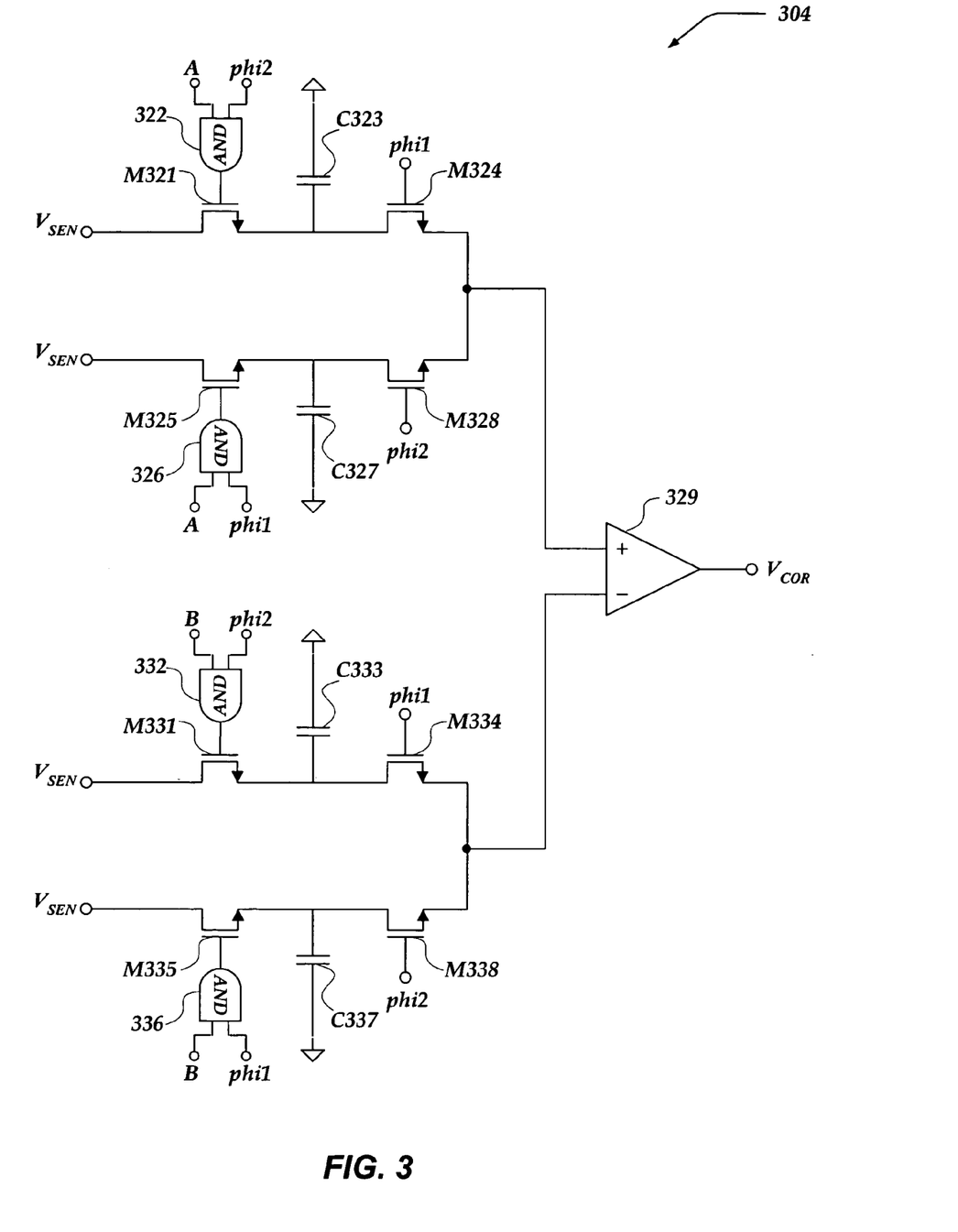
FIG. 3 schematically illustrates an embodiment of a sample and hold circuit of FIG. 1.

Inverter 212 is arranged to receive SW and provide an inverted output signal to a C-input of flip-flop 211. A QZ-output of flip-flop 211 is arranged to provide control signal phi2 to sample and hold circuit, as well as a feedback signal to a D-input of flip-flop 211. A Q-output of flip-flop 211 provide control signal phi1 to sample and hold circuit. In one embodiment, flip flop 211 may include a Dflip-flop, and the like FIG. 3 schematically illustrates an embodiment of sample and hold circuit 304 that may be implemented in hysteretic control circuit 100 of FIG. 1. Sample and hold circuit 304 is arranged to receive sensed overshoot voltage $V_{SEN}$ and provide a correction voltage $V_{COR}$ to a hysteretic voltage regulator in response to $V_{SEN}$ and control signals from a timing logic circuit such as timing logic circuit 202 described above. Sensed overshoot voltage $V_{SEN}$ is illustrated as overshoot voltage $V_{OS}$ in voltage diagram 500 of FIG. 5 below.

Sample and hold circuit 304 includes two virtually identical sample and hold subcircuits. The first subcircuit includes transistors M321, M324, M325, and M328. Transistor M321 is arranged to receive the sensed overshoot voltage $V_{SEN}$ and provide it to transistor M324. Transistor M321 is controlled by logic AND operator 322 that is coupled to its gate. Logic AND operator 322 performs an AND operation on control signals A and phi2 from timing logic circuit as described previously and controls M321 based on a result of the AND operation. A terminal of holding capacitor C323 is coupled between a drain of M321 and a source of M324 holds the sampled voltage. Another terminal of holding capacitor C323 is coupled to a ground. Holding capacitor 323 is arranged to hold the sampled voltage until M324 conducts and forwards the sampled voltage to differential amplifier 329.

Transistors M325, M328, logic AND operator 326 and holding capacitor C327 are arranged to operate virtually identically with the exception of the control signals. M325 is also arranged to receive $V_{SEN}$, but is controlled by a result of an AND operation between control signals A and phi1 from the timing logic circuit. Holding capacitor C327 holds the sampled voltage like holding capacitor C323. Transistor M328 is controlled by control signal phi2. The switching of the control signals enables the sample and hold subcircuit to sample sensed overshoot voltage $V_{SEN}$ when the circuit decides to turn off the switch because the output voltage $V_{OUT}$ has exceeded the high limit $V_{hi}$ as shown in FIG. 5.

As mentioned above, the second sample and hold subcircuit is arranged to operate virtually identical to the first sample and hold subcircuit with the exception of application of control signal B instead of control signal A to the logic AND operators. The second sample and hold subcircuit comprises transistors M331, M334, M335, and M338. Transistor M331 is controlled by logic AND operator 332 that performs an AND operation on control signals B and phi2 from timing logic circuit as described previously. Holding capacitor C333 is coupled between transistors M331, M334 and the ground. Holding capacitor C333 is arranged to hold the sampled voltage until M334 conducts and forwards the sampled voltage to differential amplifier 329. The parallel leg of the second sample and hold subcircuit includes transistors M335, M338, logic AND operator 336 and holding capacitor C337. Again, logic AND operator is arranged to receive control signal B instead of control signal A as in the first sample and hold subcircuit.

Figure 5:
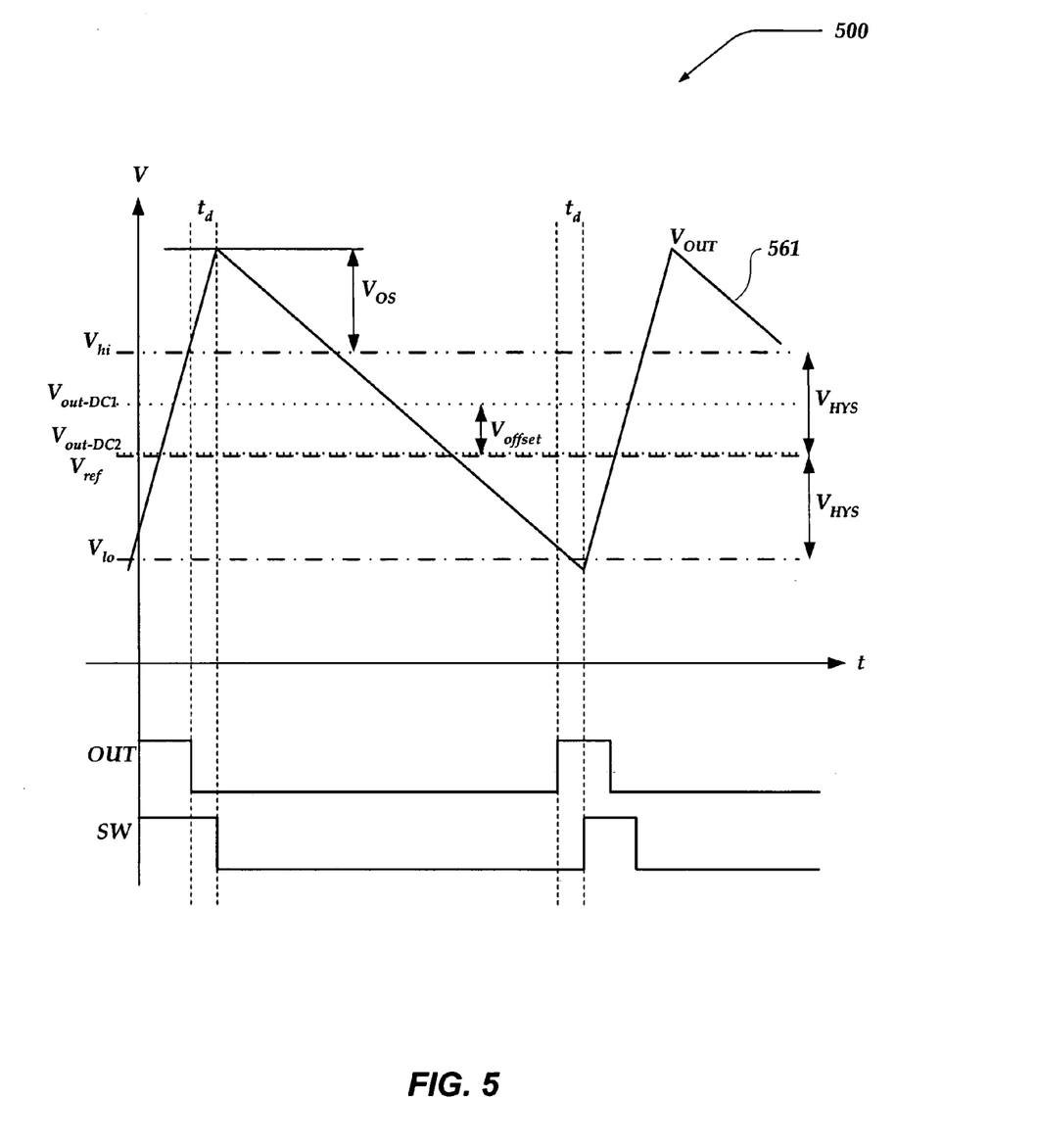
FIG. 5 illustrates a voltage diagram of various voltages involved in an operation of the hysteretic control circuit of FIG. 1.

By controlling the sample and hold operation based on control signal B, the second sample and hold subcircuit provides a sample of sensed overshoot voltage $V_{SEN}$ to differential amplifier 329 at an actual turn-off of the switch, which may occur after a delay of $t_d$ as shown in FIG. 5. This way correction voltage $V_{COR}$, which is provided by differential amplifier 329 to hysteretic voltage regulator, reflects about one half of the overshoot shoot voltage. By applying $V_{COR}$ to reference voltage $V_{ref}$ hysteretic voltage regulator is enabled to compensate an offset of a DC component of output voltage $V_{OUT}$ due to propagation delay between the decision to turn off the switch and the actual turn-off of the switch.

Figure 4:
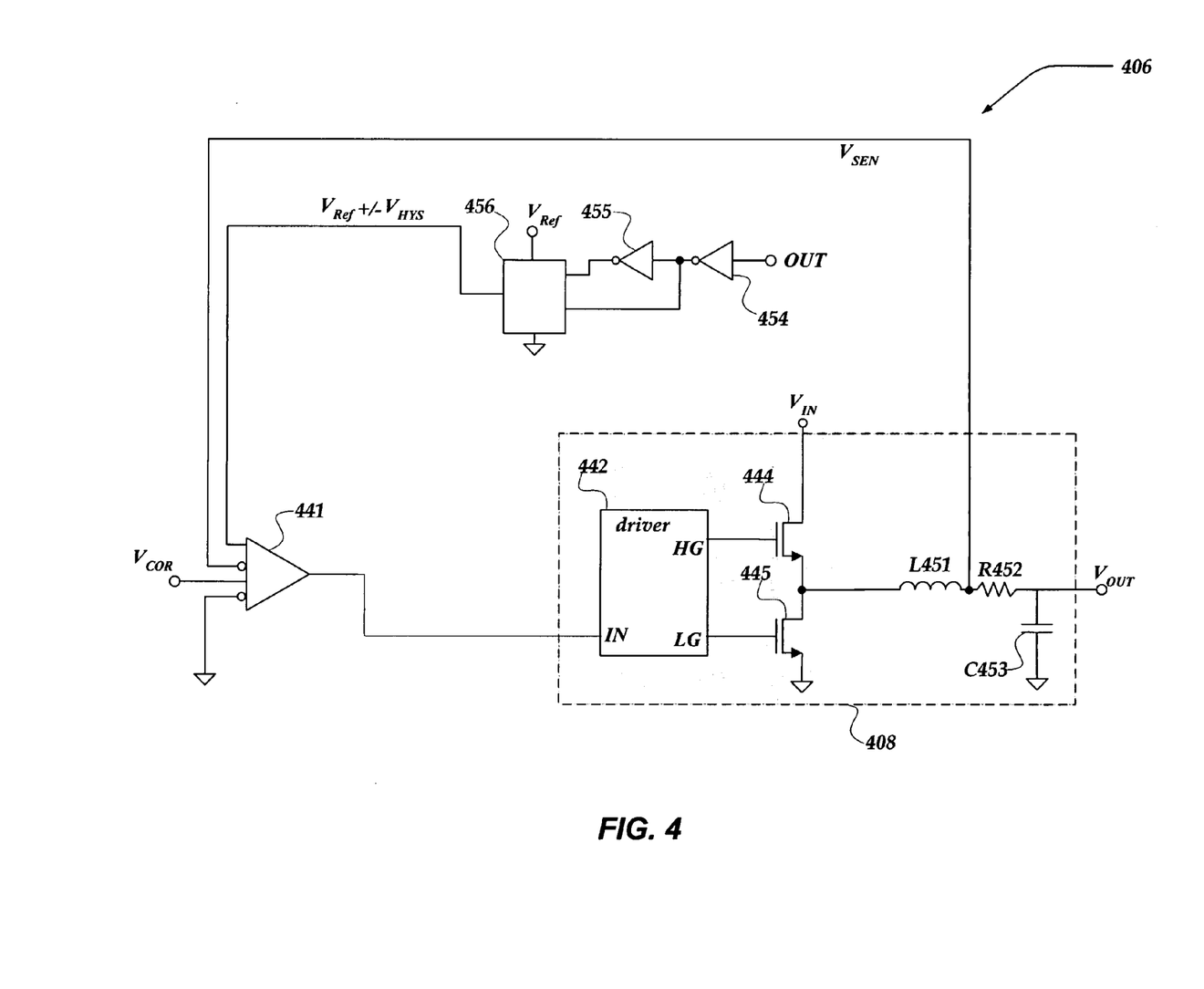
FIG. 4 schematically illustrates an embodiment of a hysteretic voltage regulator circuit of FIG. 1.

FIG. 4 schematically illustrates an embodiment of hysteretic voltage regulator 406 that may be implemented in hysteretic control circuit 100 of FIG. 1. Hysteretic voltage regulator 406 is arranged to receive input voltage $V_{IN}$, reference voltage $V_{ref}$ with hysteresis voltage $V_{HYS}$ applied, and correction voltage $V_{COR}$ from a sample and hold circuit such as sample and hold circuit 304 of FIG. 3. hysteretic voltage regulator 406 is further arranged to provide a corrected output voltage $V_{OUT}$ such that a DC component of $V_{OUT}$ has been corrected for an offset caused by propagation delays in the circuit.

As described previously, a current overshoot generated by an inductor in an output filter stage results in an overshoot of the regulated output voltage. Due to propagation delays a switch controlling the hysteresis band is turned off after a delay of $t_d$, instead of being turned off as the overshoot begins. This, in return, results in an increase of the DC component of $V_{OUT}$ being increased. As shown in FIG. 5, the offset of the DC component is about equal to one half of the overshoot voltage.

Hysteretic voltage regulator 406 includes a hysteretic feedback circuit, comparator 441, and driver and step-down-switch-mode power supply (SMPW) output stage 408. Driver and switch circuit 108 is arranged to filter and provide corrected reference voltage to the output filter. SMPW output stage 408 includes driver 442 followed by an switching transistors 444 and 445. In one embodiment, input voltage VIN may be provided to a source of switching transistor 444 as well. A node, where a gate of switching transistor 444 and a source of transistor 445 are coupled, is further coupled to inductor L451 of the output filter. L451 generates overshoot voltage $V_{OS}$, which is sensed and provided as $V_{SEN}$ to comparator 441 as well as the sample and hold circuit. Inductor L451 is followed by an RC filter comprising resistor 452 and capacitor 453. Output voltage $V_{out}$ is obtained from a node between R452 and C453.

The hysteretic feedback circuit receives control signal OUT as an input signal to inverter 454. OUT is essentially a trigger signal indicating when the switch is to be turned off in response to $V_{OUT}$ exceeding a high limit of the hysteresis band. An output of inverter 454 is coupled to an input of inverter 455 as well as a to an input of voltage controlled voltage source 456. Inverter 455 provides another input of voltage controlled voltage source 456. Voltage controlled voltage source 456 is arranged to receive reference voltage $V_{ref}$, and provide $V_{ref}+/-V_{HYS}$ based, in part, on the output voltages of inverters 455 and 456. $V_{ref}+/-V_{HYS}$ is provided to an input of comparator 441 along with $V_{COR}$, $V_{SEN}$, and ground.

FIG. 5 illustrates voltage diagram 500 of various voltages involved in an operation of a hysteretic control circuit such as hysteretic control circuit 100 of FIG. 1.

A vertical axis of voltage diagram 500 represents voltage (V). A horizontal axis represents time (t). Voltage diagram 500 illustrates waveforms for high and low limit voltages of a hysteresis band $V_{hi}$ and $V_{lo}$, reference voltage $V_{ref}$, a DC component of output voltage $V_{OUT}$ without correction $V_{out-Dc1}$ and with correction $V_{out-Dc2}$, as well as waveform 561 representing output voltage $V_{OUT}$. Overshoot voltage $V_{OS}$, offset voltage $V_{offset}$, and hysteresis voltage $V_{HYS}$ are also shown. Voltage diagram 500 further depicts logic signals OUT and SW representing when a switch is to be turned off and when the switch is actually turned off with a delay of $t_d$.

As described above, a hysteretic control circuit operates employing a hysteresis band with high and low limit voltages $V_{hi}$ and $V_{lo}$. If a regulated output voltage $V_{OUT}$ exceeds the high limit, the circuit decides to turn of the switch limiting $V_{OUT}$ as indicated by OUT changing to a high level. However, due to propagation delays caused by an overshoot current of an inductor in an output filter stage of the circuit, the switch may be actually turned off after a delay of $t_d$ as indicated by SW changing to a high level. This causes output voltage $V_{OUT}$ to overshoot the limit by overshoot voltage $V_{OS}$. The overshoot also causes a DC component of output voltage $V_{OUT}$ to be higher than a reference voltage $V_{ref}$. The offset of the DC component $V_{offset}$ may be about one half of overshoot voltage $V_{OS}$.

When a correction by monitoring overshoot voltage $V_{OS}$ and applying it to the reference voltage $V_{ref}$ is implemented as described perviously, the corrected DC component of output voltage $V_{out-Dc2}$ may be reduced such that it is about equal to $V_{ref}$ again providing a desired result of the hysteretic control circuit.

The above specification, examples and data provide a description of the manufacture and use of the composition of the invention. Since many embodiments of the invention can be made without departing from the spirit and scope of the invention, the invention also resides in the claims hereinafter appended.

We claim:

1. A circuit for voltage regulation, comprising:
   a hysteretic regulation circuit that is arranged to provide an output voltage in response to an input voltage and a correction voltage such that a DC offset of the output voltage that is caused by an overshoot voltage is corrected, wherein the overshoot voltage is an overshoot component of the output voltage;
   a sample and hold circuit that is arranged to track the overshoot voltage based on a plurality of timing control signals, and further arranged to provide the correction voltage in response to the tracked overshoot voltage; and
   a timing logic circuit that is arranged to determine when a switch is to be opened and when the switch actually opens, and is further arranged to provide the plurality of timing control signals to the sample and hold circuit in real time based on the determination, wherein the opening of the switch is arranged to reduce the overshoot voltage.

2. The circuit of claim 1, wherein the timing logic circuit is arranged to receive a first digital signal and a second digital signal, and to provide the plurality of timing control signals such that at least one of the plurality of timing control signals is based on the first digital signal and a predetermined delay, and at least another of the plurality of timing control signals is based on the second digital signal and the predetermined delay.

3. The circuit of claim 2, wherein the timing logic circuit is arranged to provide;
   a first control signal of the plurality of timing control signals based on an addition of a predetermined delay to the first digital signal;
   a second control signal of the plurality of timing control signals based on an OR operation between the first and the second digital signals; and
   a third control signal of the plurality of timing control signal based on an inversion and a delay of the second digital signal.

4. The circuit of claim 3, wherein the sample and hold circuit is arranged to:
   sample the overshoot voltage based on the first control signal;
   sample the overshoot voltage based on the second control signal;
   combine the sampled voltages; and
   provide the combined voltage to the hysteretic regulation circuit.

5. The circuit of claim 3, wherein the sample and hold circuit comprises a first sample and hold subcircuit and a second sample and hold subcircuit arranged such that:
   the first sample and hold subcircuit is arranged to sample the overshoot voltage based, in part, on the first control signal;
   the second sample and hold subcircuit is arranged to sample the overshoot voltage based, in part, on the second control signal; and
   an output of the first sample and hold subcircuit and an output of the second sample and hold subcircuit are differentially combined to provide the correction voltage.

6. The circuit of claim 5, wherein the first and the second sample and hold subcircuits comprise sampling transistors that are arranged to turn on and off in response to the third signal such that the sampled overshoot voltage is forwarded based on a delay provided by the third control signal an inverted third control signal.

7. The circuit of claim 5, wherein the first and the second sample and hold subcircuits further comprise a pair of holding capacitor circuits such that the sampled overshoot voltage is held by the capacitor circuit until it is forwarded to a differential amplifier.

8. The circuit of claim 1, wherein the hysteretic regulation circuit is arranged to detect the overshoot voltage at an output filter stage and further arranged to provide the detected overshoot voltage to the sample and hold circuit and to an inverting input of a comparator circuit.

9. The circuit of claim 8, wherein the correction voltage is provided to a non inverting input of the comparator circuit such that a DC offset of the output voltage is corrected.

10. The circuit of claim 8, comprising a hysteretic feedback circuit that is arranged to receive a reference voltage, determine a hysteresis voltage based on predetermined limits for the output voltage, and further arranged to combine the reference voltage with the hysteresis voltage such that a sum and a difference of the reference voltage with the hysteresis voltage is provided to a non-inverting input of the comparator circuit.

11. The circuit of claim 8, wherein a power supply voltage is provided to an inverting input of the comparator circuit.

12. The circuit of claim 11, wherein the power supply voltage is a ground signal.

13. The circuit of claim 1, wherein transistors of the hysteretic voltage regulator, the timing logic circuit, and the sample and hold block include at least one of a PMOS FET and an NMOS FET.

14. A method for correcting a DC offset in a hysteretic regulation circuit, comprising:
   determining a first time point when a switch is to be opened to reduce an overshoot voltage;
   determining a second time point when the switch actually opens;
   sampling the overshoot voltage based on the first and the second time points;
   providing a correction voltage based on the sampled overshoot voltage; and
   combining the correction voltage with a feedback voltage such that a DC offset on an output voltage that is caused by the overshoot voltage is corrected, wherein the overshoot voltage is an overshoot component of the output voltage.

15. The method of claim 14, further comprising combining a reference voltage and a hysteresis voltage to provide the feedback voltage.

16. The method of claim 14, further comprising controlling the sampling of one overshoot voltage based on a first digital voltage and a second digital voltage, wherein the first and the second digital voltages are based on the first and the second time points.

17. The method of claim 14, wherein the overshoot voltage is generated by an inductor at an output filter stage of the hysteretic regulation circuit.

18. A circuit for voltage regulation, comprising:
   a switching means for hysteretically controlling a voltage regulation;
   a means for detecting a delay between when the switching means is to be opened and when the switching means actually opens;
   a means for detecting an overshoot voltage in a hysteretic control means;
   a means for sampling the overshoot voltage when the switching means is to be opened and when the switching means actually opens;
   a means for providing a correction voltage based on the sampled overshoot voltage in real time; and
   a means for combining the correction voltage with a feedback voltage such that a DC offset due to the overshoot voltage is significantly reduced.

* * * * *

UNITED STATES PATENT AND TRADEMARK OFFICE
CERTIFICATE OF CORRECTION

PATENT NO. : 7,053,595 B1 Page 1 of 1
APPLICATION NO. : 10/883927
DATED : May 30, 2006
INVENTOR(S) : Tawen Mei et al.

It is certified that error appears in the above-identified patent and that said Letters Patent is hereby corrected as shown below:

In the Application:

Column 4, Line 16, After "like" insert -- . --.

Column 5, Line 60, Delete "a" before "to an".

Column 6, Line 8-9, Delete "$V_{out-Dc1}$" and insert -- $V_{out-DC1}$ --.

Column 6, Line 9, Delete "$V_{out-Dc2}$," and insert -- $V_{out-DC2}$, --.

Column 6, Line 31, Delete Delete "perviously," and insert -- previously, --.

Column 6, Line 32, Delete "$V_{out-Dc2}$" and insert -- $V_{out-DC2}$ --.

Column 7, Line 5, In Claim 3, delete "provide;" and insert -- provide: --.

Column 7, Line 13, In Claim 3, delete "signal" and insert -- signals --.

Column 7, Line 54, In Claim 9, delete "non inerting" and insert --non-inverting --.

Column 8, Line 25, In Claim 14, delete "on" and insert -- of --.

Column 8, Line 34, In Claim 16, delete "one" and insert -- the --.

Signed and Sealed this

Fourteenth Day of November, 2006

JON W. DUDAS
*Director of the United States Patent and Trademark Office*